United States Patent [19]

Yovanofski

[11] Patent Number: 4,628,988
[45] Date of Patent: Dec. 16, 1986

[54] THERMOSTATICALLY CONTROLLED SOLAR HEATING AND COOLING SYSTEM

[76] Inventor: Trayan Yovanofski, 268 Hand Ave., Ormond Beach, Fla. 32074

[21] Appl. No.: 559,875

[22] Filed: Dec. 9, 1983

[51] Int. Cl.⁴ ............................................. F25B 29/00
[52] U.S. Cl. ...................................... 165/48.2; 165/45; 239/209
[58] Field of Search .............. 165/45 S; 126/415, 416, 126/427; 237/2 B; 62/238.6; 239/179, 208, 209

[56] References Cited

U.S. PATENT DOCUMENTS

| | | | |
|---|---|---|---|
| 964,464 | 7/1910 | Crawford-Frost | 239/208 X |
| 3,910,490 | 10/1975 | Saypalia, Jr. | 126/416 |
| 4,165,037 | 8/1979 | McCarson | 62/238.6 X |
| 4,167,965 | 9/1979 | Rogers | 237/2 B |
| 4,330,040 | 5/1982 | Ence et al. | 239/209 X |
| 4,353,412 | 10/1982 | Krumhansl | 165/48 S X |
| 4,375,831 | 3/1983 | Downing, Jr. | 165/48 |

Primary Examiner—Albert W. Davis, Jr.
Assistant Examiner—Peggy A. Neils
Attorney, Agent, or Firm—James C. Wray

[57] ABSTRACT

In a heating and cooling system for a building, water from either a swimming pool or a well flows through a heat pump unit within the building and recirculates to simultaneously and automatically control ambient air temperature within the building and temperature of the pool water. Hot gases produced by the heat pump are used by an energy conservation unit to heat water for domestic use.

2 Claims, 1 Drawing Figure

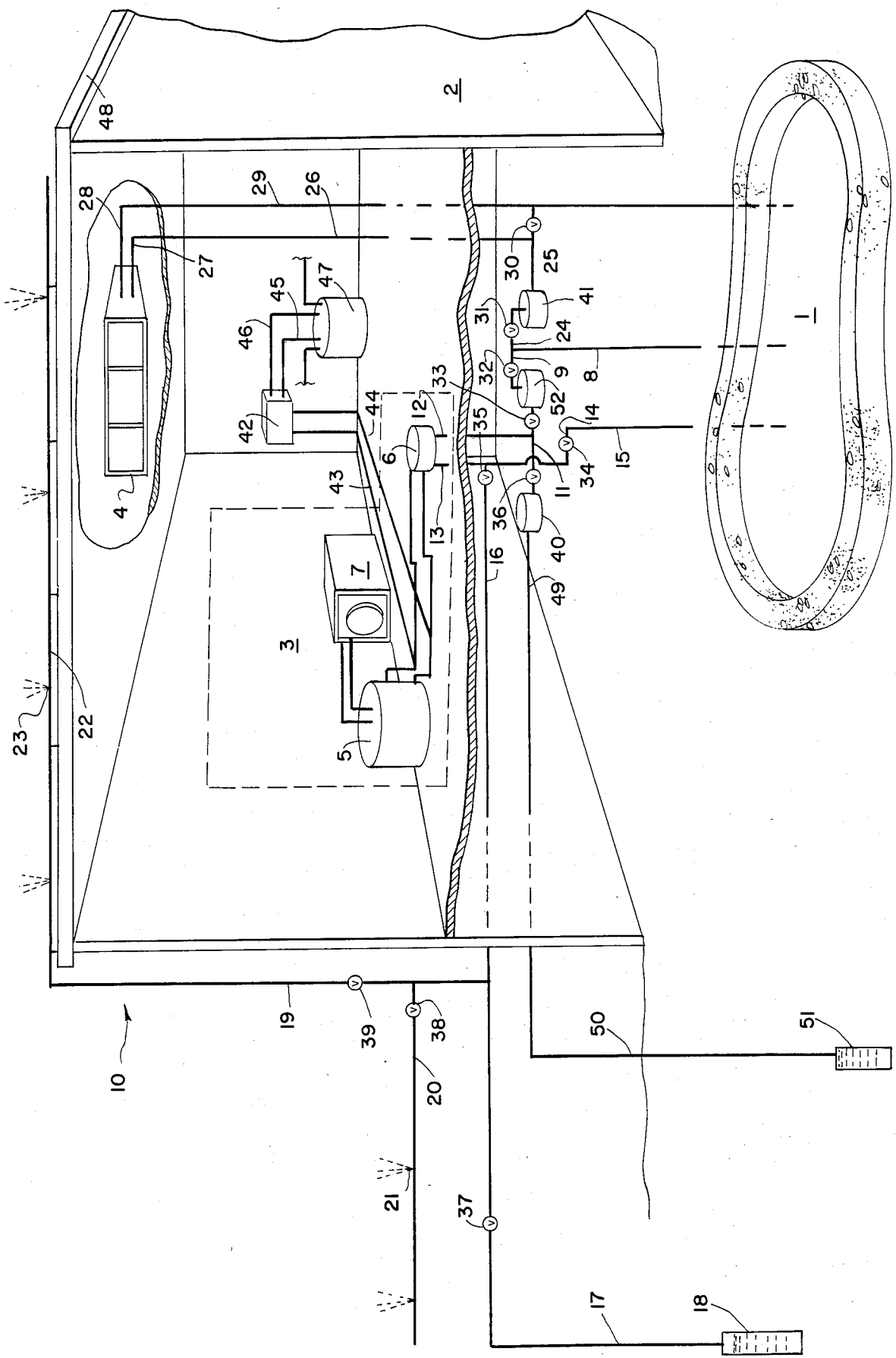

THERMOSTATICALLY CONTROLLED SOLAR HEATING AND COOLING SYSTEM

BACKGROUND OF THE INVENTION

This invention relates generally to solar heating and cooling and, more particularly, to a system wherein swimming pool water circulates through a heat pump and a solar collector.

As more conventional sources of energy, such as natural gas, oil and coal, have become increasingly more expensive and as those energy resources have become more scarce, more and more interest has been generated in harnessing solar energy, which is virtually inexhaustible in supply and is free.

Problems associated with solar energy primarily concern efficiency and, consequently, practicality.

One of the most well known means to capture energy from the sun is to flow water over a heat absorbant material covered with glass so that the sun rays generate heat, which is transfered to the water. The hot water can then be used for a variety of domestic purposes.

SUMMARY OF THE INVENTION

The present invention incorporates a simple solar collector, as described above, into a heating and cooling system designed to make maximum use of the sun's energy.

The invention is a solar heating and cooling system intended for year-round use but operable in two different modes—one for winter and one for summer. The primary components—a building, a heat pump for the building and a swimming pool—are generally already in existence prior to setting up the system. A solar collector is preferably mounted on the roof of the building and has water conduit to the swimming pool. The heat pump in the building can be any of the variety having a compressor, a heating and cooling coil and a heat exchange coil. The preferred heat pump is of a type that combines air and water as heat source, heat sinks and transfer media. For heat pumps of this type, the entire heat pump can be located entirely indoors as for instance, in a utility area. A pump takes water from the pool and delivers it through conduit to the heat pump whereupon, depending on the operating mode, the water acts to cool or heat and then is recirculated back to a pool.

For a summer or cooling mode, the pool water flowing through the heat pump cools the ambient air within the building while the heat from the building, to some extent, transfers to the water so that the recirculated water has the effect of heating the pool. At the same time, hot gases produced in the heat pump are used in an energy conservation unit and are used by the unit to heat the water in a hot water storage tank. Energy Conservation Unit (ECU) is a trademark used by Energy Conservation, Unlimited, Inc. for a device that places hot gases produced by a conventional refrigeration system, such as a heat pump, in heat exchange with cool water from a hot water-storage tank. The heat exchange causes a warming of the water within the tank and a cooling of the refrigerated gases within the heat pump. If the pool water is heated above 88° F., the water will not be useful for cooling the house. Therefore, if the pool water reaches a predetermined and thermostatically set temperature, the pool pump will cause the pool water to circulate at night through the solar collector in order to cool the water.

In the winter or heating mode of operation, pool water can be used to circulate through the heat pump so long as the water temperature is no less than 65° F. In order to maintain the pool temperature above 65° F., the pool pump will circulate the pool water through the solar collector and return the heated water back to the pool. In the event that the solar collector is insufficient to maintain the pool water temperature above 65° F., the system may be switched to well water as a source of water to flow through the heat pump. When using this secondary water source, a well pump drawing water from the well provides water through conduit to the heat pump and the return water flows through conduit to either a shallow return well or a garden sprinkler.

The return water from either water source operating in either the summer or winter mode can alternatively be communicated through conduit to a rooftop sprinkler on the building. The purpose of this feature is to provide year-round fire protection and summertime house cooling means.

The water conduit interconnecting the various components of the system has strategically positioned valves which operate in response to thermostatic settings in order to render the system virtually automatic. If the primary water source, i.e., the pool, breaks down or cannot be maintained at or above the minimum temperature, then the secondary water source, i.e., the well, enters the system by merely activating a switch.

A preferred embodiment of the invention is a completely automatic solar energy system for simultaneously heating or cooling the home, heating the water in the home and heating or cooling the pool using a heat pump, solar panels, energy conservation unit and pool water by merely pushing a button.

In the event of failure of the pool system, well water is sued as a backup supply. Well water can also be ued when it is desired to water a garden or in the event of fire. The system can be switched from pool to well by pushing a button.

This completely automatic solar energy system utilizes the heat of the sun automatically and more efficiently with no waste of water to accomplish simultaneously three energy-saving actions which no other system does. It is activated by thermostats.

In summer, water from the pool circulates through a ½ HP pump to the heat pump cooling the house. This water is recirculated back to the pool heating the pool. Simultaneously, hot gas from the heat pump goes through the energy conservation unit, which produces hot water for use in the house. If pool water is above 88° F., it can be cooled at night by passing the water through solar panesl.

In winter, if pool water is a minimum of 65° F., it is used by the heat pump to heat the house and the domestic hot water. During the day, the solar panels are automatically used to heat the pool as much as possible. If solar heat is not sufficient to heat the pool above 65° F., well water is utilized and activated by pushing a button.

When necessary to use well water, it first circulates through a separate well water pump and, then, as in the case of pool water, to the heat pump. It is then returned either to a shallow well or to a garden rooftop sprinkler. It can also be used in summer to cool the house by a rooftop sprinkler system or used as protection of the house in case of fire. Pool water cannot be used for gardening purposes.

This preferred embodiment operates completely automatically with low voltage automatic valves utilizing low power and is perfectly safe. Only the heat pump and other pumps operate on 220 volts. The lightweight rooftop sprinkler can also result in lower fire insurance rates.

The heat pump is contemplated to operate in the normal fashion, and does not per se form a part of this invention. As is well known, a heat pump works on a cycle that is basically the same as in a vapor-compression refrigeration cycle having the basic components of compressor, condenser, expansion valve, and evaporator. As is well known in the art, the compressor supplies the necessary work to move the refrigerant through the system. The gaseous refrigerant is compressed by the compressor to achieve high temperature and pressure, and is then passed into the condenser for cooling into liquid form. The condenser can be cooled by forced air or water for the purpose of removing heat from the system. The present invention contemplates cooling the condenser with water as for instances, from a pool or from a well.

Liquid refrigerant is passed from the condenser to an expansion valve where "throttling" causes a temperature drop in the fluid, which then flows through evaporation coils to absorb heat. Heat absorption gassifies the coolant or refrigerant to complete the cycle.

Heat pumps work on the same principles as a refrigeration system, except that the cycle is reversible to provide cooling in the summer and heating in the winter. While a refrigerator system deals mainly with the low temperature effect at the evaporator coils (typically located inside a "refrigerator"), a heat pump deals with the same cooling effect plus the heating effect at the condenser coils.

In a typical heat pump, heating and cooling are obtained by reversing the coolant flow between two independent air or water coil circuits.

In the cooling mode, the compressor delivers hot compressed refrigerant gas to one of the coil circuits where condensing occurs. Now in liquid form, the coolant flows through a "throttling valve" and into the second coil circuit, where the coolant is vaporized by absorbing heat. Cooled air that passes over the second coil circuit is then blown throughout the house through a duct system.

Heating simply requires a reversal of the cycle described above.

The exact specifications for a heat pump vary depending on the climatic conditions surrounding the structure to be heated and cooled. Therefoe, the location and size of the first and second coil circuits, and the pumping capacity of the compressor, will all vary depending on geographic location. The present invention does not contemplate a specific heat pump, but merely relies upon the general principles which entail first and second coil circuits and a compressor.

The present invention contemplates an automatic heating and cooling system for a building, wherein the system includes a solar collector, water conduit for communicating water from a source of water to a heat pump, and for recirculating water back to the source of water, water conduit means for communicating water from the source of water to the solar collector or solar panels, and for recirculating water back to the source of water, pump means for pumping water through the previously mentioned water conduits and through the solar collector, and valve means, disposed throughout the water conduit for directing water flow from the source of water to the heat pump and back to the source of water, and for directing water flow from the source of water to the solar collector and back to the source of water, whereby heat exchange occurs at the heat pump to either warm or cool the return water, depending on whether a heating or cooling mode is selected for the heat pump, and whereby heat exchange occurs at the solar collector to either warm or cool the water circulating through the solar collector depending on the mode of operation selected for the heat pump.

It is also the object of the invention to provide an automatic solar energy apparatus for heating and cooling a home comprising a house having a roof, solar panels on the roof of the house, a swimming pool adjacent the house, first conduit means connecting the swimming pool to the solar panels, the first conduit means having a pump for pumping water from the swimming pool through the solar panels and second conduit means connecting the solar panels to the swimming pool for flowing water from the solar panels back to the swimming pool, a heat pump, and a compressor, and a third conduit connecting the swimming pool to the second heat exchanger and a second pump connected to the third conduit for pumping water from the swimming pool to the second heat exchanger and a fourth conduit connected to the second heat exchanger and to the swimming pool for flowing water from the second heat exchanger to the swimming pool, fluid in the heat pump conduit in the second heat exchanger being in direct heat exchange contact through the second heat exchanger with water in the second heat exchanger from the third conduit.

In the typical heat pump apparatus, two heat exchangers, i.e., first and second coil circuits, are provided. Often, one heat exchanger will be positioned inside the house and the other will be positioned outside the house. As previously mentioned, the exact location of the heat exchangers need not be specified for the present invention to operate properly.

The present invention further contemplates a fully automated system that can easily be switched from one mode of operation to another, and from one of plural sources of water to another, and from one of plural return areas.

In one mode of operation, water is withdrawn from a swimming pool by a pump, circulated through the heat pump, and returned to the swimming pool. If the pool water is too cool to provide the required heat exchange in the heat pump, then a second pump connected to an alternative source of water, such as a well, can be activated to provide water to the heat pump. No matter what source of water is selected, the return water can be delivered either to the pool, to a return well, to a lawn sprinkler, or to a roof sprinkler. The choice of return can be manually selected by switching means, such as by solenoid actuated valves.

Thermostats can be used to render the system fully automated. For instance, a thermostatic setting for the ambient air temperature within the building can determine the operation of the various pumps.

An object of the invention is, therefore, to provide a thermostatically controlled solar heating and cooling system that more efficiently captures and uses the sun's energy.

Another object of the invention is to provide a thermostatically controlled solar heating and cooling system that is capable of simultaneously cooling the interior of a building, heating hot water for domestic use within the building and heating a swimming pool adjacent to the building.

Another object of the invention is to provide a thermostatically controlled solar heating and cooling system capable of simultaneously cooling the interior of a building, heating hot water for domestic use within the building, and heating a pool adjacent the building.

Another object of the invention is to provide a thermostatically controlled heating and cooling system that has a primary water source and a secondary water source.

Another object of the invention is to provide a thermostatically controlled solar heating and cooling system capable of protecting a building from fire.

Another object of the invention is to provide a heating and cooling system that is energy efficient and easy to operate.

Yet another object of the invention is to provide a solar heating cooling system that does not detract from the aesthetic qualities of a building.

These and other and further objects and features of the invention are apparent in the disclosure which includes the above and below specification and claims and drawings.

BRIEF DESCRIPTION OF THE DRAWING

FIG. 1 is a diagrammatic illustration of a solar heating and cooling system according to the invention.

DETAILED DESCRIPTION OF THE INVENTION

Referring to FIG. 1, the solar heating and cooling system of the present invention is indicated generally by the number 10. The system has four principal components: a swimming pool (1), a building (2), a heat pump (3) and solar collectors (4).

The heat pump (3) generally comprises a compressor (5), a first coil circuit (6) and a second coil circuit (7).

Water conduit interconnects the various components of the system and creates a water communicating network.

A pump (52) circulates pool water from the swimming pool (1) to the heat pump (3) through conduit segments (8), (9), (11) and (12). Having passed through the heat pump, the water is recirculated back to the swimming pool (1) through conduit segments (13), (14) and (15).

A pool pump (41) which is normally used to circulate the pool water through a filter to clean the water is used to circulate the pool water from the swimming pool (1) to the solar collectors (4) through conduit segments (8), (24), (25), (26) and recirculate the pool water back to the swimming pool (1) through conduit segment (28).

When it is not desirable or feasible to use the pool water as a water source, a well (51) may be used as a secondary water source, a well pump (40) circulates well water from the well (51) to the heat pump (3) through conduit segments (50), (49), (11) and (12) and recirculates the well water either to a shallow return well (18) through conduit segments (13), (16) and 17, a garden sprinkler (21) through conduit segments (13), (16), (19) and (20) or to the rooftop sprinkler (23) through conduit segments (13), (16), (19) and (22).

In a summer or cooling mode of operation, pump (52) circulates pool water from the swimming pool 1 to the heat pump (3) through conduit segments (8), (9), (11) and (12). The pool water circulates through first coil circuit (6) whereupon heat from the air in the building is transfered to the pool water, which, when recirculated back to the swimming pool (1) through conduit segments (13), (14) and (15), has the effect of heating the pool. Meanwhile, hot gases produced in the heat pump are passed through the energy conservation unit (42) through gas conduit (43). The unit (42) takes water from a hot water storage tank (47) through conduit (46) and heats the water with the hot gas. Heated water flows back to the storage tank (47) through conduit (45), while the gas recirculates from the unit (42) back to the heat pump (3) through conduit (44). Valve (53) selectively controls the gas flow through conduit (43), (44).

A thermostat within the building (not shown) controls the operation of the system. As long as the pool water temperature does not exceed 88° F., the heat pump, cooled by the pool water, will cool the ambient air within the house while simultaneously heating hot water for domestic use in the house and heating the pool water. If the pool water temperature exceeds 88° F., the pool pump can be used at night to circulate water from the pool to the solar collectors through water conduit segments (8), (24), (25), (26) and to recirculate water to the pool through conduit segments (28) and (29) to cool the water.

A series of valves (30), (31), (32), (33), (34), (35), (36), (37), (38) and (39) are used to direct the flow of water through the various conduit segments and define a variety of different flow paths.

In a winter or heating mode of operation, as long as the pool water remains at or above 65° F., pump (52) circulates pool water to heat pump (3) as described for the summer or cooling mode of operation. In order to maintain the pool water temperature at or above 65° F., the pool pump (41) circulates pool water from the swimming pool (1) to the solar collectors (4) during daylight hours in order to heat the pool water. If solar collectors cannot sufficently maintain the pool water temperature, then the system may be switched over to a secondary water source, i.e., well water. Well pump (40) circulates well water from the well (51) to the heat pump (3) through conduit segments (50), (49), (11) and (12) and recirculates the return water either to a shallow return water well (18) through conduit segments (13), (16) and (17) to the garden sprinkler (21) through conduit (13), (16), (19) and (20) or to the rooftop sprinkler (23) through conduit segments (13), (16), (19) and (22).

While the invention has been described with reference to specific embodiments, the exact nature and scope of the invention is defined in the following claims.

What I claim is:

1. A solar heating and cooling system for simultaneously heating or cooling an ambient air system within a building, heating a hot water supply for domestic use within the building and heating or cooling a swimming pool adjacent the building comprising a building, a swimming pool as a primary water source, a solar connector connected to the swimming pool, a heat pump for controlling ambient air temperature within the building, an energy conservation unit connected to the heat pump and to the hot water supply for utilizing hot gases from the heat pump to heat water in the hot water supply, an air heat exchanger connected to the air system and to the heat pump for selectively heating or cooling air in the building, a water heat exchanger connected to a water source for selectively transferring heat between the heat pump and the water source, a well as a secondary water source connected to the water heat exchanger, a shallow return well for recycled well water, a garden sprinkler, a rooftop sprinkler for the building selectively connected to the water heat exchanger, a pool pump and filter, a well pump, a pump for supplying pool water to the heat pump, water conduits interconnecting the pool with the water heat exchanger and the pool with the solar collector and valves within the conduits operating to selectively control the flow of water to effect summer and winter operating modes and valves selectively connecting the water heat exhenager with the primary or secondary water source that draw upon either the primary or the secondary water source.

2. The solar heating and cooling system of claim 1 wherein the secondary water source is used primarily in the winter mode of operation or when the primary water source exceeds predetermined temperature.

* * * * *